United States Patent
Plona

(10) Patent No.: US 7,404,678 B2
(45) Date of Patent: Jul. 29, 2008

(54) ROTOR RECENTERING AFTER DECOUPLING

(75) Inventor: Daniel Plona, Vulaines sur Seine (FR)

(73) Assignee: Snecma, Paris (FR)

( * ) Notice: Subject to any disclaimer, the term of this patent is extended or adjusted under 35 U.S.C. 154(b) by 600 days.

(21) Appl. No.: 10/517,763

(22) PCT Filed: Jun. 25, 2003

(86) PCT No.: PCT/FR03/01957

§ 371 (c)(1),
(2), (4) Date: Dec. 23, 2004

(87) PCT Pub. No.: WO2004/007915

PCT Pub. Date: Jan. 22, 2004

(65) Prior Publication Data

US 2005/0220384 A1  Oct. 6, 2005

(30) Foreign Application Priority Data

Jun. 27, 2002  (FR) .................................. 02 07978

(51) Int. Cl.
*F16C 23/04*  (2006.01)
*F16C 41/00*  (2006.01)

(52) U.S. Cl. ........................ 384/624; 384/495; 384/627; 415/174.1

(58) Field of Classification Search ................... 384/99, 384/215, 220–222, 535–536, 624–627, 495–499, 384/558; 60/39.091, 223, 264, 226.1, 796; 415/142, 170.1, 228–229; 417/9, 174, 174.4
See application file for complete search history.

(56) References Cited

U.S. PATENT DOCUMENTS

| 4,375,906 | A  | * | 3/1983  | Roberts et al. ............... 384/627 |
| 5,433,584 | A  | * | 7/1995  | Amin et al. ..................... 415/9 |
| 5,791,789 | A  |   | 8/1998  | Van Duyn et al. |
| 6,009,701 | A  |   | 1/2000  | Freeman et al. |
| 6,073,439 | A  | * | 6/2000  | Beaven et al. .................. 60/223 |
| 6,082,959 | A  | * | 7/2000  | Van Duyn ....................... 415/9 |
| 6,109,022 | A  | * | 8/2000  | Allen et al. ..................... 60/223 |
| 6,325,546 | B1 | * | 12/2001 | Storace ........................ 384/536 |
| 6,331,078 | B1 | * | 12/2001 | Van Duyn .................... 384/498 |
| 6,491,497 | B1 | * | 12/2002 | Allmon et al. ............... 416/174 |
| 6,783,319 | B2 | * | 8/2004  | Doerflein et al. ............... 415/1 |
| 6,799,416 | B2 | * | 10/2004 | Plona et al. .................... 60/223 |
| 7,011,490 | B2 | * | 3/2006  | Albrecht et al. ................ 415/9 |
| 7,097,413 | B2 | * | 8/2006  | VanDuyn ........................ 415/9 |

* cited by examiner

*Primary Examiner*—Marcus Charles
(74) *Attorney, Agent, or Firm*—Oblon, Spivak, McClelland, Maier & Neustadt, P.C.

(57) ABSTRACT

A recentering device for a rotor shaft for recentering a rotor shaft relative to an axis X of a stator structure in the event of decoupling caused by excessive imbalance. The shaft, in normal operating conditions, lies on the axis X and is radially supported by a bearing support disposed in a bore of the axis X in the stator structure. The bearing support has an outside diameter smaller than the diameter of the bore, to enable the bearing support to orbit about the axis X in the event of decoupling. The bearing support is connected to the stator structure by radially fusible elements. The recentering device recenters the bearing support after decoupling.

13 Claims, 5 Drawing Sheets

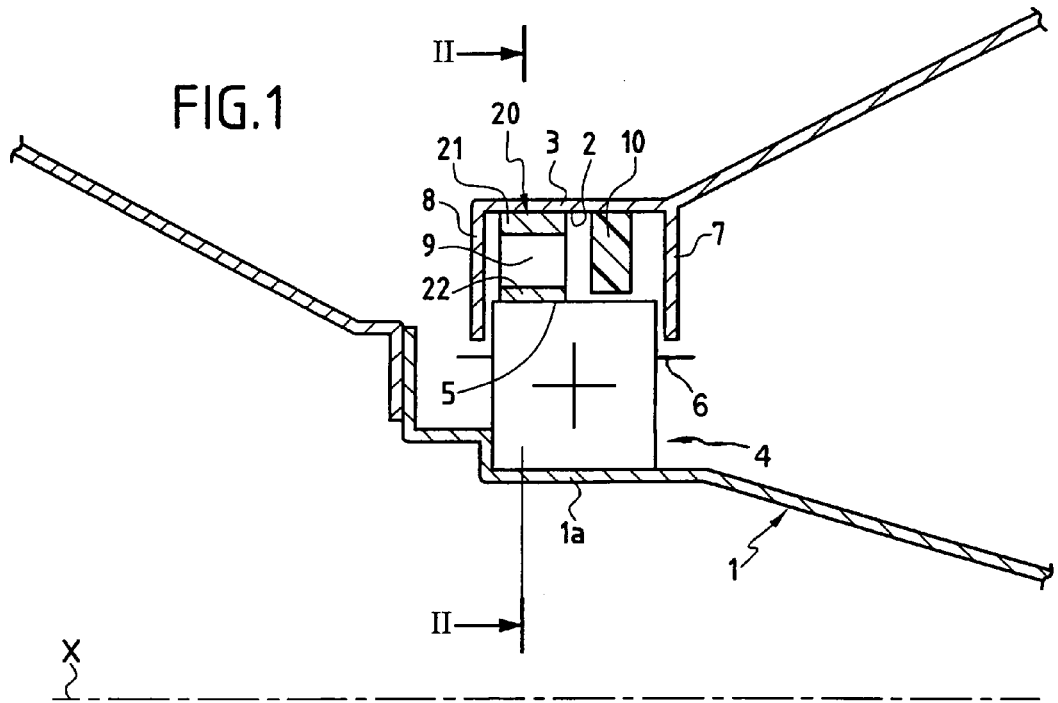
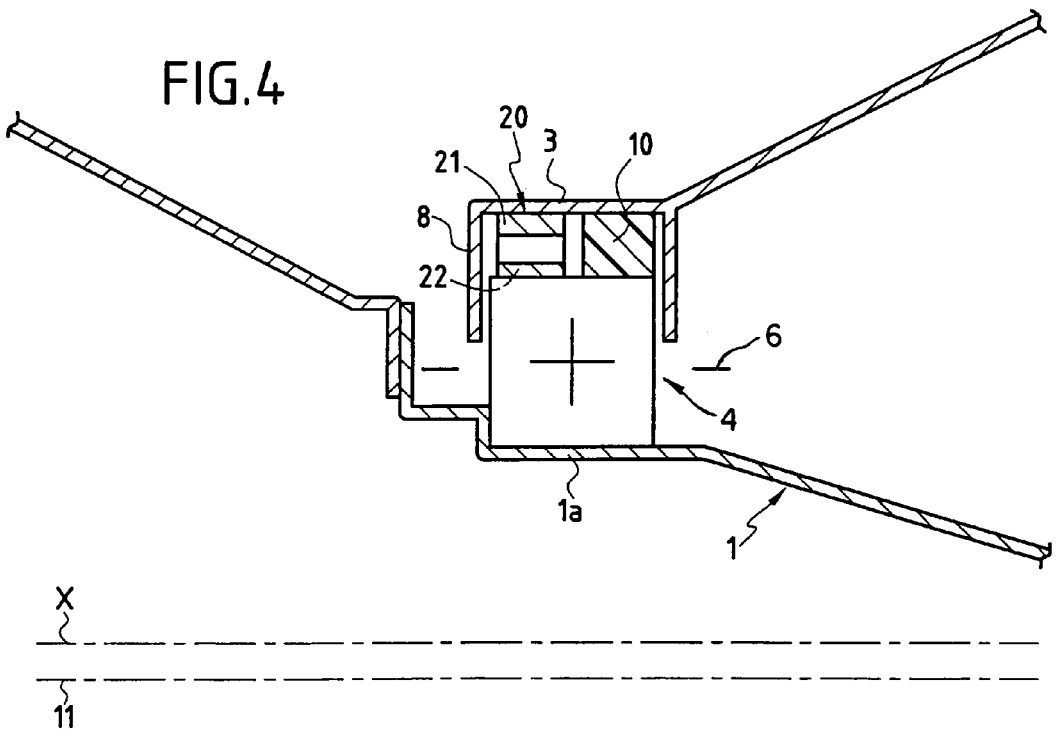

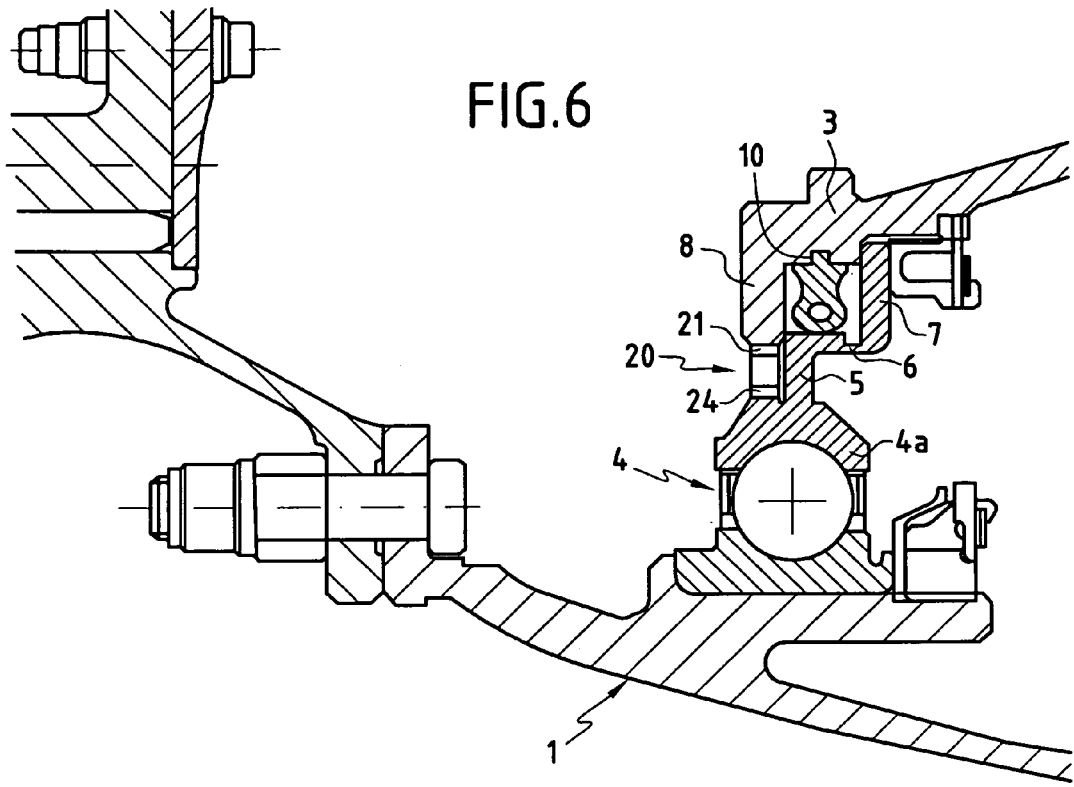
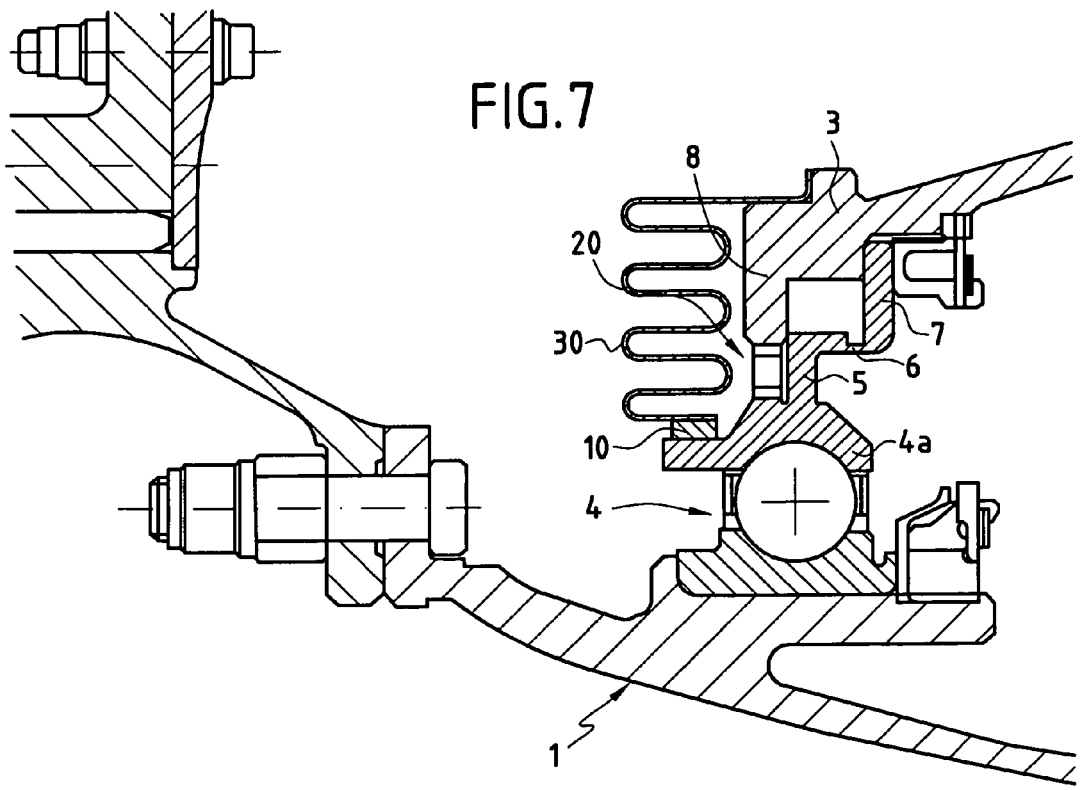

ROTOR RECENTERING AFTER DECOUPLING

BACKGROUND OF THE INVENTION

FIELD OF THE INVENTION

The invention relates to the difficulty of turbomachines remaining intact in the event of decoupling caused by accidental and excessive imbalance.

The invention relates more particularly to the integrity of a turbojet after a fan blade has broken off, for example.

DISCUSSION OF THE BACKGROUND

A turbojet comprises an engine which drives a fan that is disposed at the front of the engine.

The blades of the fan may be damaged following ingestion of foreign bodies, particularly during take off at full revolutions per minute (rpm). Generally, the fan is strong enough to withstand the effects of ingesting foreign bodies without too much damage being caused, and is capable of continuing to operate, albeit perhaps with reduced efficiency.

In certain circumstances, however, the fan may be damaged to such an extent that it loses pieces of one or more blades. This results in a major imbalance, which makes it necessary to turn off the engine in order to reduce danger to the aircraft. Nevertheless, such large imbalance caused by the loss of a blade leads to major cyclical loads which must be accommodated, at least while the engine is running down to reach the windmilling speed of the fan. The windmilling speed is the speed at which the engine rotates, in a non-operational state, as a result of the aircraft moving through the air.

A usual way of eliminating the cyclical loads that must be accommodated by the structure consists in decoupling the rotary shaft of the fan from the stator structure at the front bearing of the shaft. This is usually carried out by inserting fusible elements between the bearing support and the stator structure, said fusible elements breaking as soon as the radial forces that must be accommodated by the bearing exceed a predetermined value, i.e. as soon as there is an excessive imbalance. The fan shaft is then free to move radially to a certain extent, and to orbit around the longitudinal axis of symmetry of the engine, and the fan continues to turn about an axis of rotation that passes close to the new centre of gravity of said fan. Nevertheless, in certain circumstances, the vibration resulting from the imbalance and that persists at the windmilling speed may still be considerable.

This is due to the natural frequency of vibration of the fan and to the reduction in the radial stiffness of the support bearing. Therefore, in various shaft support arrangements there are means for maintaining a certain amount of bearing stiffness, or even for bringing the axis of the shaft substantially back onto the axis of the engine.

Hence, U.S. Pat. No. 6,073,439 provides an annular elastic element between the bearing support and the stator structure, said element being coaxial about the axis of the engine, which element exerts radial forces on the bearing support, said radial forces being directed towards the axis of the engine and tending to bring the axis of the bearing support back towards the axis of the engine. The stiffness of the linkage after decoupling is clearly much less than the stiffness of the bearing in its normal operating state without decoupling.

U.S. Pat. No. 6,009,701 describes a fan shaft support bearing in which the support of the outer bushing is fastened to the stator structure by radially fusible elements, in order to release the shaft relative to the stator structure in the event of the fusible elements breaking. The bushing support is surrounded by an open ring of helicoidal shape, which is capable of cooperating with a conical wall forming part of the stator structure. Said conical wall includes a helicoidal groove which makes it possible to move the helicoidal ring from an extreme position where the clearance available for the shaft is the greatest to another extreme position where the axis of the shaft is once again coaxial on the axis of the engine, after the axis of the shaft has orbited around the axis of the engine while the fan drops in speed from its operating speed to the windmilling speed.

U.S. Pat. No. 6,009,701 represents the prior art that is closest to the invention, because the rolling of the open ring in the helicoidal groove drives a movement in precession of said ring in a direction opposing orbiting of the bearing support axis, and the final positioning of said ring ensures that the bearing is of stiffness that is substantially equal to its stiffness in its normal operating state. But that arrangement requires axial displacement by the open ring on the bearing support, and a device to ensure that the open ring is kept stationary during normal operation, so that it cannot move at an untimely moment during normal operation of the engine, which might prevent subsequent decoupling in the event of excessive imbalance.

SUMMARY OF THE INVENTION

The object of the invention is to provide a recentering device which, during normal operating of the engine, cannot prevent subsequent decoupling, and which ensures satisfactory stiffness of the bearing after recentering.

The invention thus provides a recentering device for recentering a rotor shaft relative to the axis X of a stator structure in the event of decoupling caused by excessive imbalance, said shaft, in normal operating conditions, lying on the axis X and being radially supported by a bearing support that is disposed in a bore of axis X in said stator structure, said bearing support having an outside diameter that is smaller than the diameter of said bore, in order to enable said bearing support to orbit about the axis X in the event of decoupling, said bearing support being connected to the stator structure by radially fusible elements, said device comprising means for recentering the bearing support after decoupling.

According to the invention, said recentering device is characterized by the fact that the recentering means for recentering the bearing support comprise means for generating a movement in precession P of said bearing support in the direction opposite to the direction of its orbits after decoupling, and a plurality of devices for decreasing the clearance available to said bearing support relative to the axis X, said devices for decreasing clearance being regularly distributed around the axes of the two parts constituted by the stator structure and the bearing support, and each part including a first ramp that is provided on one of said two parts and a protuberance provided on the other of said two parts, said protuberance being, in normal operating conditions, radially spaced apart from said first ramp and capable of coming into contact with said first ramp during the movement in precession of said bearing support.

Most advantageously, in order to ensure ideal recentering, all the protuberances are capable of being in contact with the first ramps at the same time.

Since the first ramps and the protuberances are stationary elements fitted respectively to the stator structure and to the bearing support, or on the contrary, to the bearing support and to the stator structure, their positioning in normal operating conditions is defined accurately by the positioning of the bearing support on the stator structure during assembly.

When ideal recentering is obtained, all the protuberances are in contact with respective first ramps, which ensures bearing stiffness that is close to the stiffness of the bearing in normal operating conditions.

According to an additional advantageous characteristic, the first ramp has the profile of an involute to a circle, and two adjacent first ramps are connected together by a radial shoulder.

During normal operation, the protuberance is disposed close to the shoulder.

Preferably, the first ramp has the profile of an Archimedes spiral.

In a first configuration, the protuberances are made in the form of blocks.

In a second configuration, the protuberance is formed by an end portion of a second ramp, said second ramp having a profile similar to the profile of the first ramp.

In a first embodiment, both the first ramp and the protuberance are made of metal, and in order to avoid impacts during decoupling, the protuberance is located, in normal operating conditions, in a position that is radially spaced apart from the associated first ramp by a distance that is greater than the expected radial displacement of the bearing support during decoupling.

In a second embodiment, the first ramp is made of elastomer and the protuberance is made of metal. If the protuberance is a portion of a second ramp, the distance between the two ramps may be considerably less than the expected radial displacement of the bearing support, thereby ensuring, in the event of decoupling, that one of the ramps can roll on the other ramp, so that the precession of the bearing support leads to recentering of the bearing support.

Preferably, the means for generating the movement in precession of the bearing support comprise an elastomer ring secured to the stator structure, said ring surrounding the bearing support and, being in permanent contact therewith, so that the bearing support can roll without sliding in the bore of said ring after decoupling.

Said elastomer ring is advantageously disposed in the bore of the stator structure. This makes it possible to eliminate impacts between the bearing support and the stator structure during decoupling.

BRIEF DESCRIPTION OF THE DRAWINGS

Other advantages and characteristics of the invention appear on reading the following description, given by way of example and with reference to the accompanying drawings, in which:

FIG. 1 is a diagrammatic half-section, based on a radial plane containing the axis of symmetry of a turbojet, showing the region of the front bearing that supports the shaft of a fan in normal operating conditions;

FIG. 4 is similar to FIG. 1 and shows the offset of the axis of the shaft from the axis of symmetry of the engine after decoupling;

FIGS. 6 and 7 show variant embodiments.

DETAILED DESCRIPTION OF THE PREFERRED EMBODIMENTS

Figure 2:
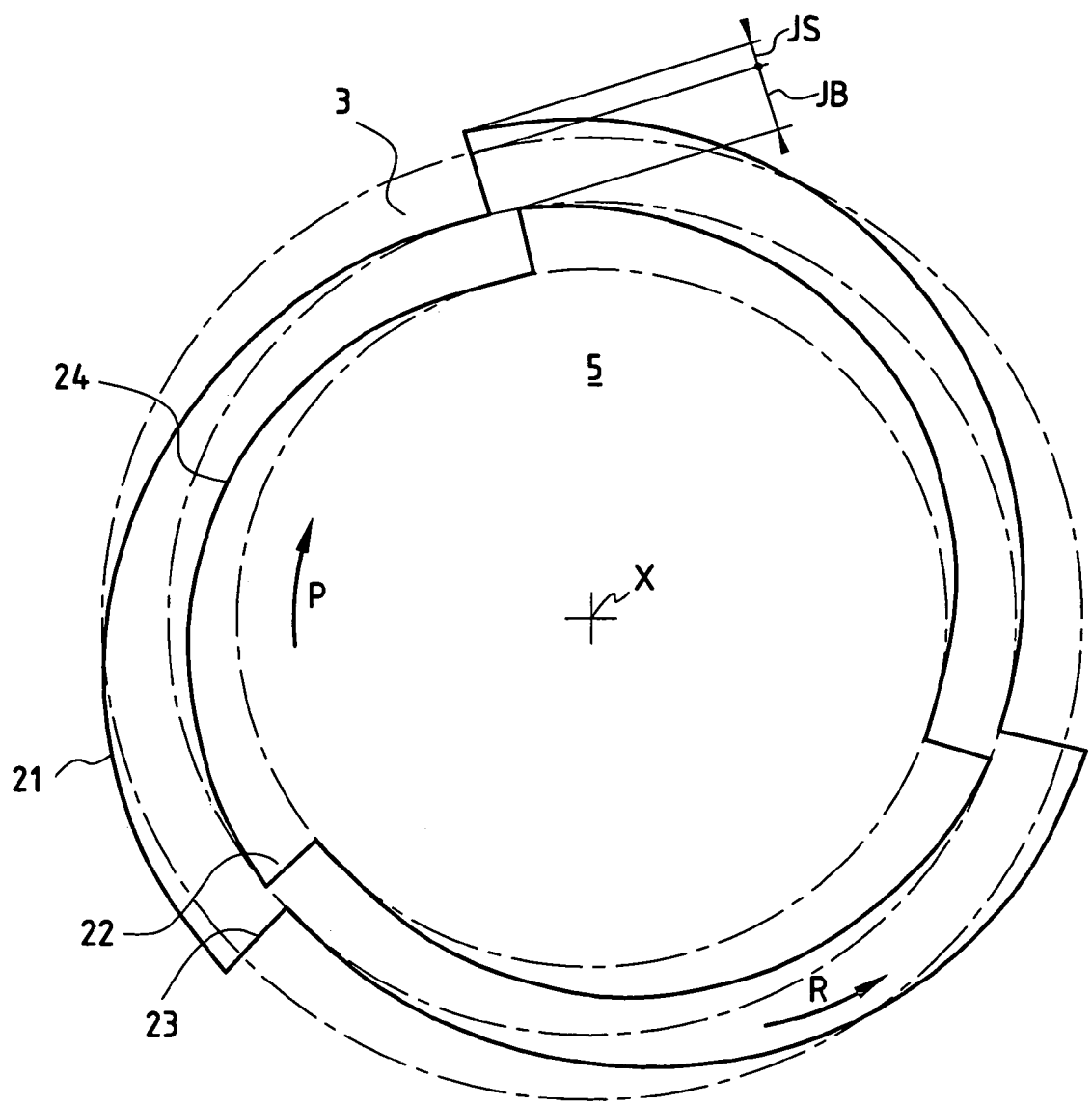
FIG. 2 is a radial section on line II-II in FIG. 1, showing the devices for decreasing clearance for the bearing support of an embodiment of the invention in normal operating conditions.

FIG. 1 is a diagram of the front portion of a shaft 1 for driving a fan in a turbojet of axis X, said shaft being held on the axis X in the bore 2 of a stator structure 3 by means of a bearing 4 having an inside bushing that is assembled snugly on the periphery of a portion 1a of the shaft 1, and having an outside bushing that is held in the bore of a bearing support 5, which bearing support 5 has a diameter that is much smaller than the diameter of the bore 2 of the stator structure 3.

The bearing support 5 is connected to the stator structure 3 by radially fusible elements, or programmed breaking zones, referenced 6. References 7 and 8 indicate axial abutments that are secured to the stator structure 3 for limiting the axial displacement of the bearing support 5.

An annular space 9 is thus arranged radially between the periphery of the bearing support 5 and the wall of the stator structure 3 which defines the bore 2. The radial thickness of the space is equal to the difference in diameter between the bore 2 and the outside diameter of the bearing support 5, and it is designed to be large enough to allow for radial displacement of the axis of the bearing support 5, in the event of the fusible elements 6 breaking, following excessive imbalance created by a blade breaking, for example, during normal operation of the turbojet.

As shown in FIG. 1, an elastomer ring 10 that is secured to the stator structure 3 is disposed in the annular space 9. Said elastomer ring surrounds the bearing support 5 and includes an inside bore having a diameter that is slightly larger than the diameter of the bearing support 5.

When the fusible elements 6 break, as shown in FIG. 4, the axis 11 of the shaft 1, which is also the axis of the bearing support 5, moves away from the axis X of the stator structure 3, and the bearing support 5 comes to bear against the inside surface of the bore in the elastomer ring 10.

The axis 11 begins to orbit about the axis X in the direction of rotation R of the shaft 1. As a result, the bearing support 5 begins to roll, preferably without sliding, in the bore inside the elastomer ring 10. Said rolling movement causes the bearing support 5 to move in precession P in a direction which is opposite to the direction of rotation R, as in an epicyclic gear system, at a speed that is a function of the diameters of the bearing support 5 and of the bore in the elastomer ring.

The proposed bearing arrangement also comprises devices 20 for decreasing clearance relative to the axis X, after decoupling, said devices being implemented by the movement in precession P.

Figure 3:
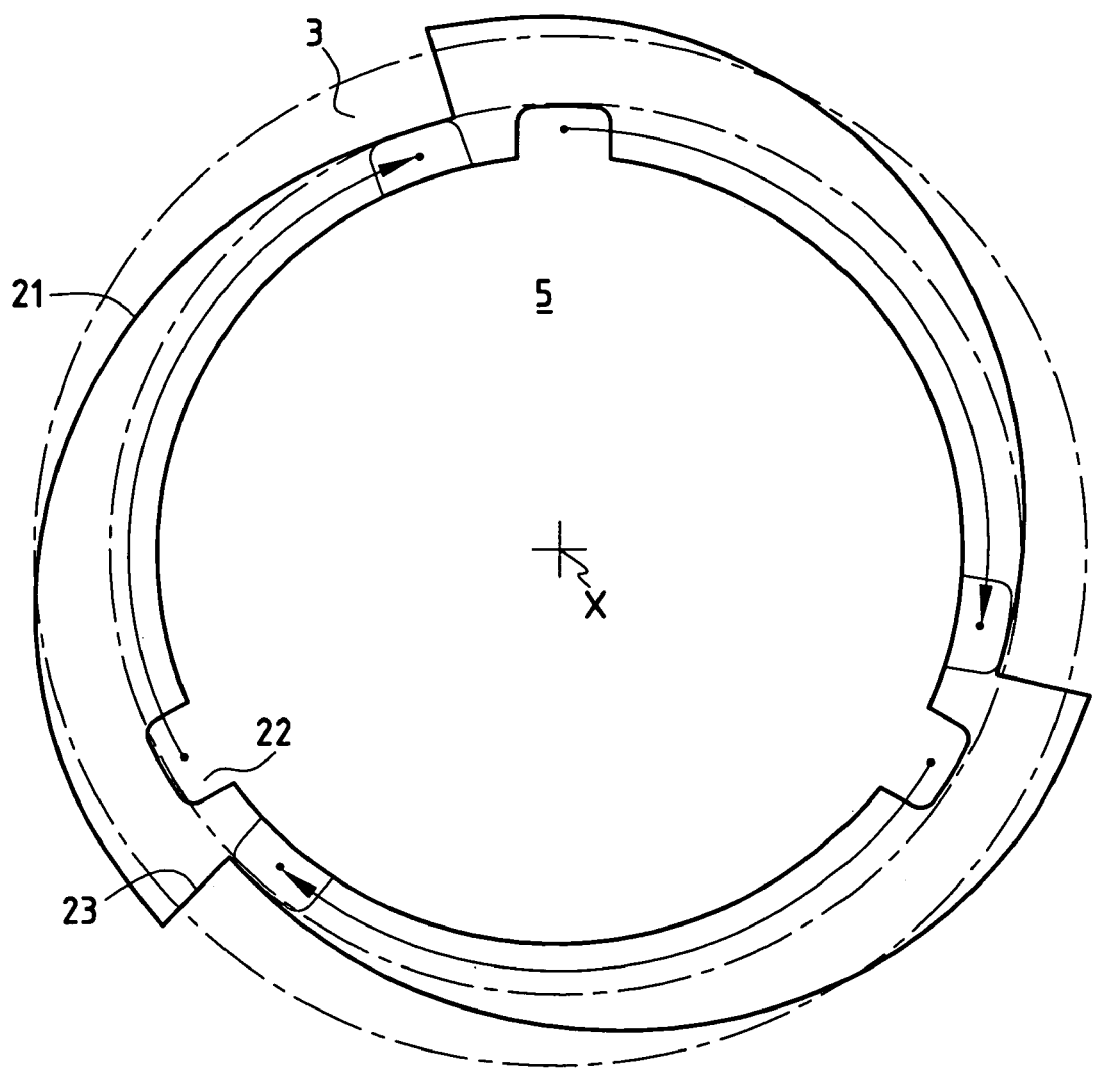
FIG. 3 is similar to FIG. 2 and shows a second embodiment of the invention.

Such devices 20, which are three in number in the examples shown in FIGS. 2 and 3, are regularly distributed around the axis X, and each comprise a first ramp 21, preferably having the profile of an involute to a circle or of an Archimedes spiral, that is provided on one of the parts constituted by the stator structure 3 and the bearing support 5, and a protuberance 22 that is axially offset from the first ramp 21, the protuberance being provided on the other one of the parts, constituted by the bearing support 5 and the stator structure 3. Two adjacent ramps 21 are connected by a radial shoulder 23.

In normal operating conditions, i.e. in the absence of decoupling, the protuberance 22 is disposed circumferentially in the vicinity of a radial shoulder 23 and the distance that separates the protuberance 22 from the first associated ramp 21 is greater than the radial displacement expected of the bearing support 5 immediately after decoupling, in order to prevent a protuberance 22 and the first associated ramp 21 from impacting each other when decoupling occurs, with the radial forces generated by decoupling then being taken up by the elastomer ring 10.

During the movement in precession P of the bearing support 5 after decoupling, the protuberances 22 move away from the associated shoulders 23. Given the profiles of the first ramps 21, the minimum clearance existing between the tips of the protuberances 22 and the first ramps 21 will gradually decrease until one of them comes into contact with the first associated ramp 21. From then on, the clearance available for the bearing support 5 is limited by said successive contacts, and the axis 11 of the bearing support 5 moves closer to the axis X during subsequent movement in precession P by the bearing support 5.

When the three protuberances 22 are in contact at the same time with the three first ramps 21, the axis 11 coincides with the axis X, thereby achieving ideal recentering. The profile of the first ramps 21 is designed to enable this condition to be achieved, by selecting the distance lying between the tips of the protuberances 22 and the axis of symmetry, X or 11, of the part that carries them, so that said distance lies between the distances of the ends of the radial shoulders 23 from the axis of symmetry 11 or X, of the part that carries them.

In FIG. 2, JB indicates clearance for the expected displacement of the axis 11 of the bearing support 5, during decoupling, and JS indicates the safety clearance needed to avoid impacts when decoupling takes place. At the beginning of the movement in precession P, the clearance JS decreases without there being any contact between the protuberances 22 and the first ramps 21. Then as the clearance JB is taken up, successive contacts are made between the protuberances 22 and the first ramps 21. Once the clearance JB has been taken up in full, as shown in FIG. 5, the bearing support 5 is recentered on the axis X.

FIG. 3 shows the protuberances 22 made in the form of blocks secured to the bearing support 5, the first ramps 21 being secured to the stator structure 3.

FIG. 2 shows the protuberances 22 constituted by the end portions of a set of second ramps 24, said ramps having profiles identical to the profiles of the first ramps 21.

Figure 5:
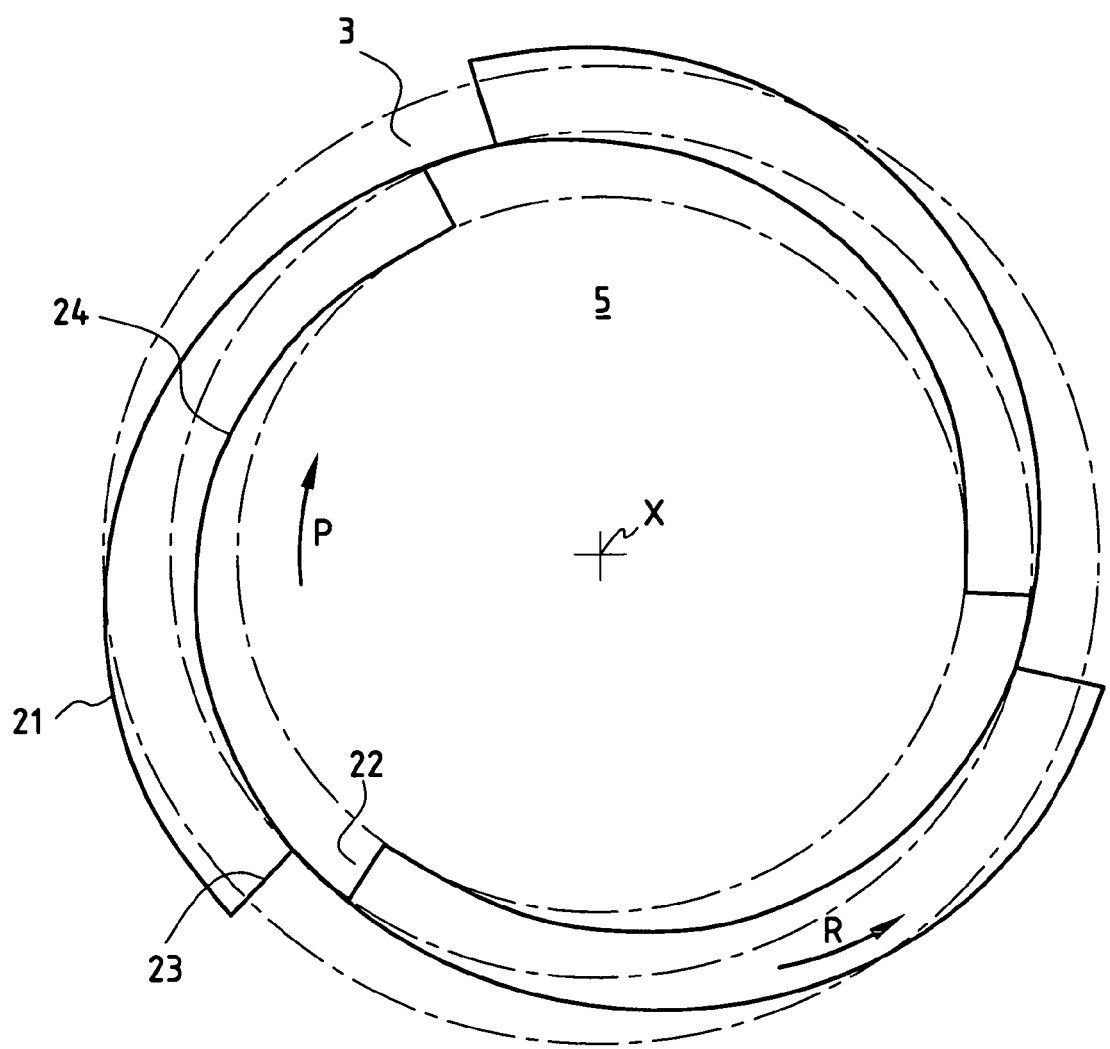
FIG. 5 shows the disposition of the elements of the devices for decreasing clearance for the bearing support after recentering following decoupling.

FIG. 5 shows the position of the ramps 21 and 24 in FIG. 2 when the three end portions 22 of the second ramps 24 are in contact with the first ramps 21 at the same time, which position corresponds to ideal recentering of the bearing support 5 and, hence, of the shaft 1.

The bearing support 5 is then immobilized and ceases to rotate by a wedge effect between the end portions 22 and the first ramps 21.

The ramps 21 and 24 are preferably made of metal and can be disposed in the annular space 9, as shown in FIG. 1.

However, the first ramps 21 could also be provided on the axial abutment 8, with the second ramps 24 or the blocks being provided on the outside bushing 4a of the bearing 4, outside the annular space 9, as shown in FIGS. 6 and 7.

FIG. 6 also shows a ring 10 made in the form of a flexible elastomer bushing.

As shown in FIG. 7, the ring 10 may be a rigid hoop connected to the stator structure 3 by a flexible metal support 30 that is situated outside the annular space 9. What matters, is that the bearing support 5 should be permanently in contact with the ring 10 after decoupling in order to allow for the movement in precession P, at a speed that is proportional to the gear reduction ratio in order to cause the safety clearance JS and the clearance JB for the expected displacement to be taken up progressively when the first ramp 21 and the protuberance 22 move towards each other.

In the embodiments shown in the drawings, the three protuberances 22 can all be in contact with the three ramps 21 at the same time, thereby ensuring ideal recentering. It should be observed that it is possible to provide a device to limit the maximum angle of precession of the bearing support 5 relative to the stator structure 3, in order to make sure that the protuberances 22 are positioned quite near the first ramps 21 after a predetermined movement in precession by the bearing support 5, which corresponds to residual clearance of small amplitude.

Another variation of the device proposed consists in replacing at least one of the metal ramps 21 and 24 by elastomer ramps. The only drawback to such a solution is that smaller stiffness is obtained after recentering, but then it would no longer be necessary to use an elastomer ring 10 nor a flexible metal support 30, such as the supports shown in FIGS. 6 and 7, since elastomer ramps also perform the function of moving the bearing support 5 in precession in order to take up the clearance.

The invention claimed is:

1. A recentering device for a rotor shaft for recentering a rotor shaft relative to an axis X of a stator structure in an event of a decoupling caused by excessive imbalance, said shaft, in an absence of said decoupling, lying on the axis X and being radially supported by a bearing support disposed in a bore of the axis X in said stator structure, said bearing support having an outside diameter that is smaller than a diameter of said bore, to enable said bearing support to orbit about the axis X in the event of said decoupling, said bearing support being connected to the stator structure by radially fusible elements, said device comprising:

means for recentering the bearing support after said decoupling, wherein the recentering means of the bearing support comprises means for generating a movement in precession by said bearing support in a direction contrary to a direction of said bearing support's orbits traveled after said decoupling, and a plurality of devices for decreasing permitted clearance of said bearing support relative to the axis X, said devices for decreasing permitted clearance being arranged regularly around the axes of two parts constituted by the stator structure and the bearing support, and each part including a first ramp provided on one of said two parts and a protuberance provided on the other of said two parts, said protuberance being, in the absence of said decoupling, radially spaced apart apart from said first ramp and configured to come into contact with said first ramp during the movement in precession of said bearing support.

2. A device according to claim 1, wherein all the protuberances are configured to be in contact with the first ramps at a same time.

3. A device according to claim 1, wherein each first ramp has a profile of an involute to a circle, and two adjacent first ramps are connected by a radial shoulder.

4. A device according to claim 3, wherein each first ramp has a profile of an Archimedes spiral.

5. A device according to claim 1, wherein the protuberances are made in a form of blocks.

6. A device according to claim 1, wherein each protuberance is formed by an end portion of a second ramp, said second ramp having a second profile similar to a first profile of an associated first ramp.

7. A device according to claim 6, wherein each first ramp is made of elastomer and the second ramp is made of metal and can roll on the first ramp, without sliding, after said decoupling, to generate the movement in precession.

8. A device according to claim 1, wherein each first ramp and the protuberance are made of metal.

9. A device according to claim 8, wherein each protuberance is located, in the absence of said decoupling, in a position radially spaced apart from an associated first ramp by a distance that is greater than an expected radial displacement of the bearing support during said decoupling.

10. A device according to claim 1, wherein the means for generating the movement in precession comprises an elastomer ring secured to the stator structure, said elastomer ring surrounding the bearing support and being in permanent contact therewith so that the bearing support can roll without sliding in the bore of said elastomer ring after said decoupling.

11. A device according to claim 10, wherein said elastomer ring is disposed in the bore of the stator structure.

12. A device according to claim 10, wherein said elastomer ring is rigid and is connected to the stator structure by a flexible metal support.

13. A device according to claim 1, comprising three first ramps and three protuberances.

* * * * *